United States Patent
Ecochard

(10) Patent No.: US 8,801,321 B2
(45) Date of Patent: Aug. 12, 2014

(54) DEVICE FOR ENABLING THE LOCKING/UNLOCKING OF A MEMBER ON AND OUT OF A STRUCTURE

(75) Inventor: Michel Ecochard, Chaponnay (FR)

(73) Assignee: Renault S.A.S., Boulogne-Billancourt (FR)

( * ) Notice: Subject to any disclaimer, the term of this patent is extended or adjusted under 35 U.S.C. 154(b) by 194 days.

(21) Appl. No.: 13/264,766

(22) PCT Filed: Apr. 20, 2010

(86) PCT No.: PCT/FR2010/050761
§ 371 (c)(1),
(2), (4) Date: Dec. 1, 2011

(87) PCT Pub. No.: WO2010/122267
PCT Pub. Date: Oct. 28, 2010

(65) Prior Publication Data
US 2012/0076569 A1 Mar. 29, 2012

(30) Foreign Application Priority Data
Apr. 20, 2009 (FR) ..................................... 09 52570

(51) Int. Cl.
*F16B 21/02* (2006.01)
(52) U.S. Cl.
USPC .................. 403/322.1; 403/348; 70/278.7
(58) Field of Classification Search
USPC ........... 403/321, 322.1, 322.3, 323, 348, 349; 180/68.5; 903/951, 952; 70/275, 277, 70/278.7
See application file for complete search history.

(56) References Cited

U.S. PATENT DOCUMENTS

| 3,102,411 A | 9/1963 | Friedman | |
|---|---|---|---|
| 4,431,333 A * | 2/1984 | Chandler | .................... 403/322.3 |
| 5,439,310 A * | 8/1995 | Evenson et al. | ............... 403/321 |
| 6,203,237 B1 * | 3/2001 | Swift et al. | .................. 403/322.3 |

(Continued)

FOREIGN PATENT DOCUMENTS

| DE | 20 2007 013 514 | 1/2008 | |
|---|---|---|---|
| EP | 0 976 901 | 2/2000 | |
| JP | 62218224 A * | 9/1987 | ............... B60K 1/04 |
| JP | 2002218713 A * | 8/2002 | ............. H02K 15/02 |

OTHER PUBLICATIONS

International Search Report Issued Jan. 28, 2011 in PCT/FR10/050761 Filed Apr. 20, 2010.

(Continued)

*Primary Examiner* — Michael P Ferguson
(74) *Attorney, Agent, or Firm* — Oblon, Spivak, McClelland, Maier & Neustadt, L.L.P.

(57) ABSTRACT

A device for enabling locking/unlocking of a member including a latch on/out of a structure including a housing for receiving an active portion of the latch, including: a cylindrical sheath coaxially receiving a first hollow rod capable of rotation relative to the revolution axis of the sheath and including an upper end capable of interaction with the latch of the member, and a second coaxial rod inside the first hollow rod, capable of rotation and translation respectively along and relative to the revolution axis of the sheath and including an upper end capable of interaction with the active portion of the latch so as to actuate the same into a functional locking or unlocking position; a mechanism for enabling rotation of each of the two rods relative to the sheath revolution axis independently from each other; and a mechanism for enabling rotation of the second rod.

5 Claims, 5 Drawing Sheets

(56) References Cited

U.S. PATENT DOCUMENTS

| | | | |
|---|---|---|---|
| 6,767,155 B2 * | 7/2004 | O'Brien et al. | 403/322.1 |
| 7,699,555 B2 * | 4/2010 | Dembowsky et al. | 403/322.3 |
| 2007/0286674 A1 * | 12/2007 | Khoshnevis | 403/345 |

OTHER PUBLICATIONS

French Search Report Issued Jan. 19, 2010 in French Patent Application No. 0952570 Filed Apr. 20, 2009.

* cited by examiner

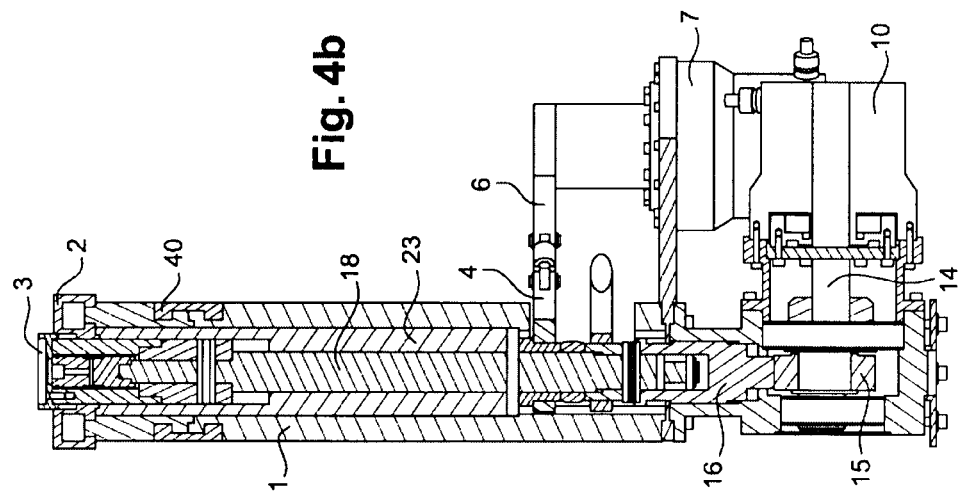
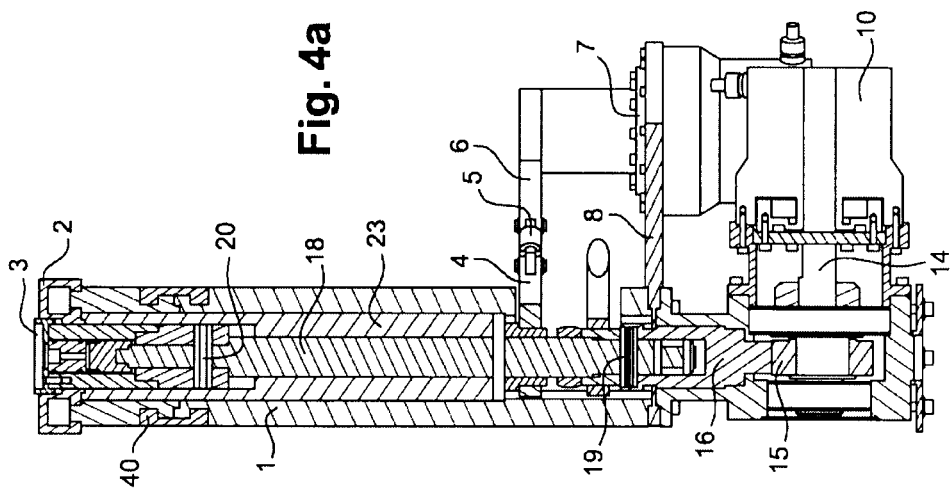

DEVICE FOR ENABLING THE LOCKING/UNLOCKING OF A MEMBER ON AND OUT OF A STRUCTURE

FIELD OF THE INVENTION

The invention relates to a device capable of locking and unlocking an element furnished with a latch respectively on and off a structure furnished with a housing suitable for receiving and cooperating with the active portion of said latch.

The invention relates more generally to a partially automated installation designed to allow the standard exchange of an element or of a determined component within a larger structure. It is aimed more particularly at the context of the standard exchange of batteries of motor vehicles that are purely electrically powered and not thermally powered.

PRIOR ART

Problem Posed

The increasing scarcity of oil on the one hand and the political desire to adopt an approach of saving the environment on the other hand have led the manufacturers of motor vehicles to desire to replace the thermal energy used to propel vehicles with electric energy. However, one of the major difficulties said manufacturers have to face lies in the limited range of the electric batteries used hitherto and the particularly long time it takes to charge them.

Thus, in order to get around this difficulty, the idea has been developed not to recharge said battery or batteries within the vehicle in which they are installed but, when the battery is flat or almost flat, to carry out a standard exchange of it within purpose-built stations, said stations consequently recharging the batteries thus replaced.

However, because of the weight of said batteries, typically a few hundred kilograms, it is appropriate to ensure an effective attachment of the latter inside the vehicle and hence, in the context of the principle specified above, it is necessary to extract the battery or batteries from said vehicle and install a charged battery while ensuring the efficacy of the attachment or, on the other hand, of the unlocking and to do so in a relatively short time because, for such a general solution to be viable, a typical time for a standard exchange of such a battery is envisaged to be less than five minutes.

The problem therefore arises of carrying out, within this short time, the unlocking of the used battery and the locking of a charged battery while complying with the stringent specifications of attachment of said battery inside the vehicle. Specifically, it is easy to understand that, an account of the considerable weight of these batteries, these locking and unlocking mechanisms are crucial.

The object of the present invention is to propose a device capable of performing this function of locking/unlocking a battery within a motor vehicle and more generally any element designed to be secured to or separated from a structure.

Currently such a device is not known.

SUMMARY OF THE INVENTION

The subject of the present invention is therefore a device for locking/unlocking an element furnished with a latch on/off a structure furnished with a housing capable of receiving the active portion of said latch. The subject of the present invention is therefore a device making it possible to actuate a latch capable of attaching an element to a structure.

This device comprises:
- a cylindrical sheath receiving coaxially a first hollow rod that can rotate relative to the axis of revolution of said sheath and the top end of which is provided with a means capable of interacting with the latch of said element, and more particularly with the lower coupling parts of said latch, and a second rod, coaxial to and on the inside of the first hollow rod, that can move in translation and in rotation, respectively along and relative to the axis of revolution of said sheath, and the top end of which is furnished with a means capable of interacting with the active portion of the latch so as to be able to actuate the latter in an operational position of locking or of unlocking and typically of imparting a rotary movement thereto;
- means for ensuring the rotation of each of the two rods relative to the axis of revolution of the sheath, independently of one another;
- and means for ensuring the movement in translation of the second rod.

In other words, the invention consists in incorporating within one and the same device the various functions necessary for actuating a latch and more precisely for locking and unlocking a latch, taking account of the specifics of the context in which these operations are involved. This therefore gives a device which can be removed from the latch, is capable of interacting with a latch once placed in the appropriate position by virtue of means of interaction with pieces for the bottom coupling of the latch.

According to one feature of the invention, the means for rotating the two rods each consist of a link arm, each being actuated by an electric motor, and coupled to the rod in question, the two link arms being substantially parallel with one another and oriented on two planes substantially perpendicular to the axis of revolution of the sheath. Thus, it is possible to impart independent movement to each of the link arms and consequently to the rods to which they are coupled.

According to another feature of the invention, the coupling of the link arms to the respective rods may be carried out inside the sheath, the latter being provided for this purpose with an opening in its side wall, of dimensions suitable for the desired clearance of the link arms and consequently to the desired angle of rotation of the rods.

According to another feature of the invention, the translation of the second rod along the axis of revolution of the sheath may be ensured by means of a pushing element collinear with the rod in question, actuated by a cam with an axis of rotation perpendicular to the desired direction of translation, itself rotated by means of an electric motor. This translational movement of the second rod can then be imparted independently of the movements that are imparted to the link arms extending in the planes perpendicular to the axis of revolution of the sheath. Since this translational movement must apply a considerable pressure to the latch via the second rod, the electric motor chosen is then more powerful than the electric motors actuating the link arms extending in the planes perpendicular to the axis of revolution of the sheath.

The independence of all the movements makes it possible to design as appropriately as possible to their use each of the motors that are to impart the movements, which helps to reduce the price of the device for ensuring the locking/unlocking of a latch.

BRIEF DESCRIPTION OF THE FIGURES

The way in which the invention can be embodied and the advantages that arise therefrom will emerge better from the exemplary embodiment that follows, given as an indicative and nonlimiting embodiment with reference to the appended figures.

FIG. 1 is a schematic representation in perspective of the device according to the invention of which

FIGS. 4a and 4b illustrate schematically two positions of the second rod of the device according to the invention respectively in the retracted position and in the out position, and therefore operational.

EMBODIMENT OF THE INVENTION

The invention is more particularly described with reference to a device of the type in question used in the context of the locking and the unlocking of batteries of electrically propelled motor vehicles.

It is however understood that the invention should not be restricted to this single application.

Figure 1:
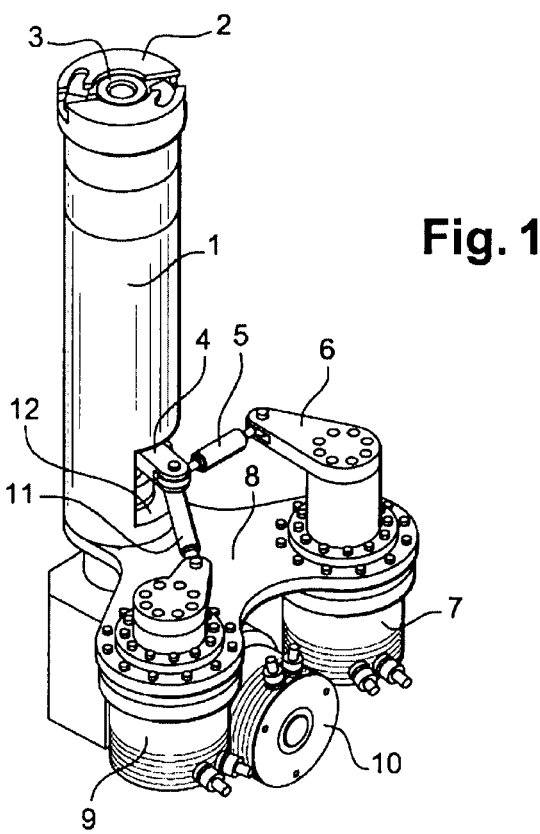
Figure 2:
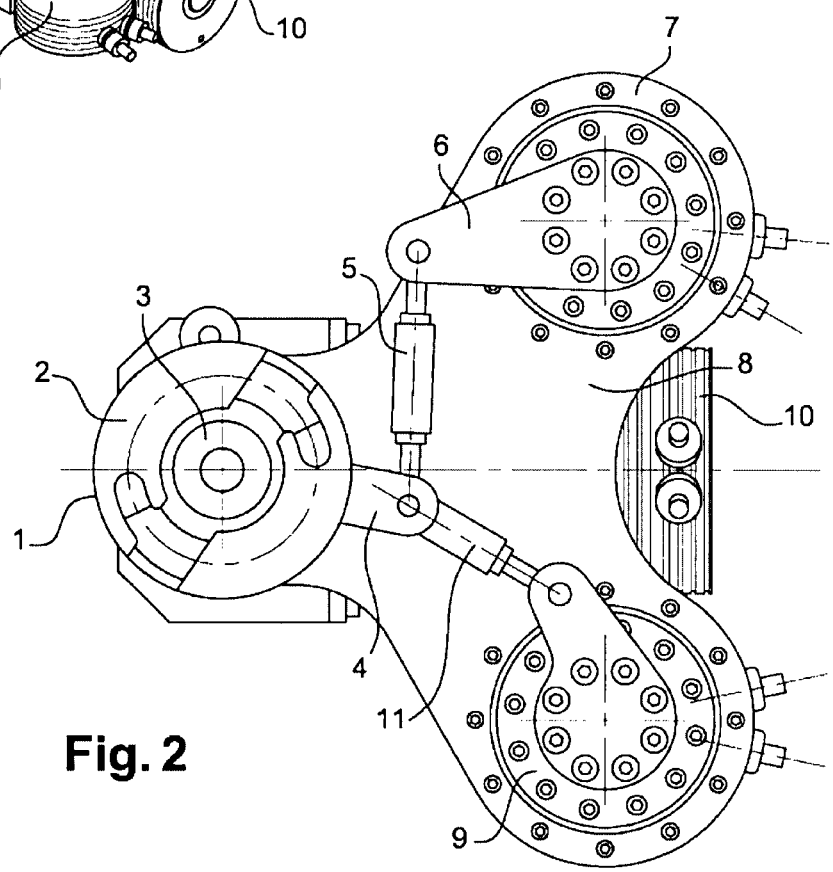
FIG. 2 is a view from above and FIG. 3 is a view in sagittal section.
Figure 3:
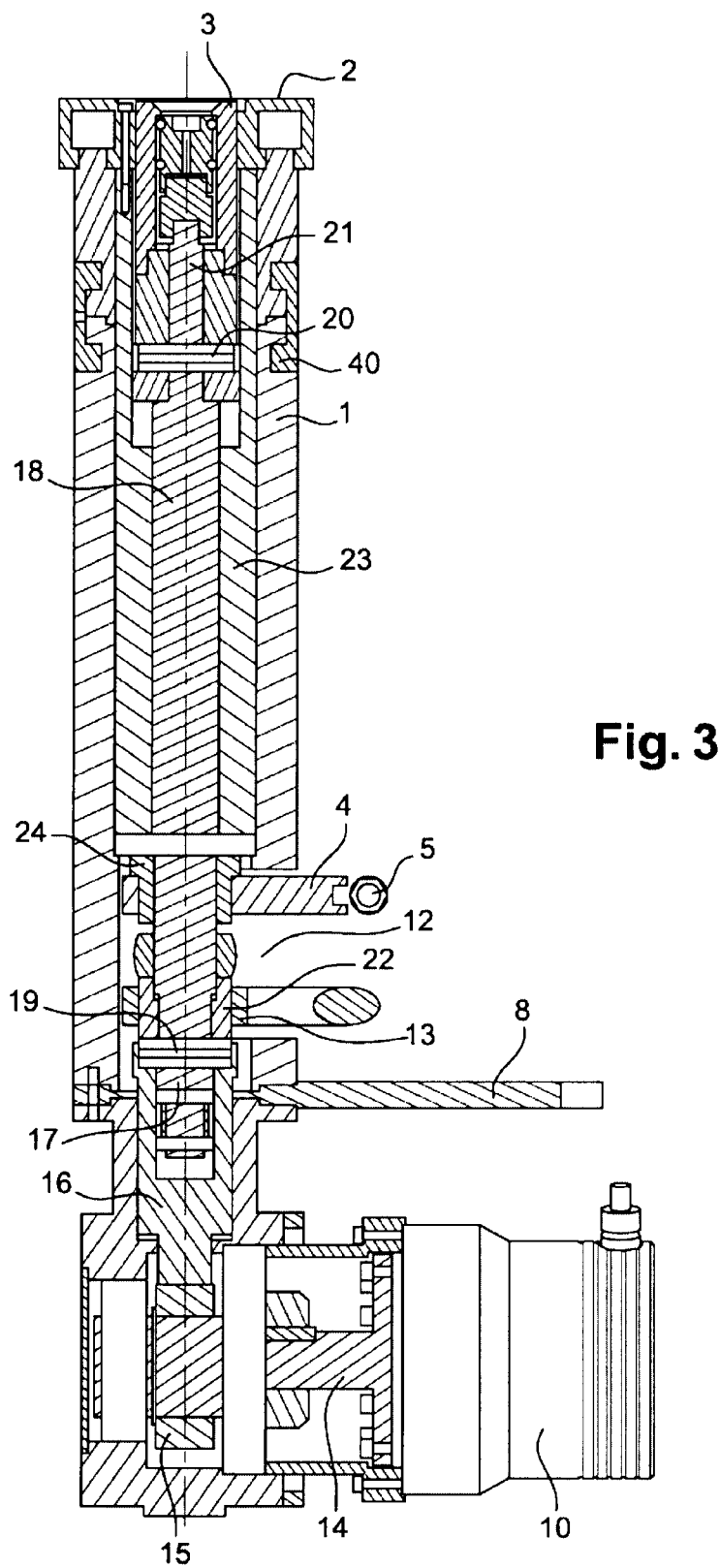

Therefore shown with respect to FIGS. 1 to 3 are various explanatory views of the device according to the invention.

Fundamentally, the latter consists of a rigid, cylindrical sheath 1 the base of which is attached to a baseplate 8, itself secured for example to a lifting device in order to allow the sheath 1 to ascend and descend, in order respectively to take hold of and unlock the battery from the motor vehicle or, on the other hand, to take hold of a recharged or new battery and install it in a housing provided for this purpose within said motor vehicle.

This sheath 1 comprises, at its top end, a rotary member 2 provided with means 30, in this instance means that are two in number and diametrically opposed, designed to interact with a corresponding member of a latch with which the battery that it is desired to manipulate thus is furnished. At the centre of this member 2 there is, therefore also at the top end of the sheath 1, another member 3 capable of translational movement as will be described in greater detail below.

In the vicinity of the bottom base of the sheath 1 and attached to the plate 8 are two electric motors, respectively 7 and 9, actuating all of the link arms 4, 5, 6 for the motor 7 and 11, 13 for the motor 9, some of which enter the sheath 1 at an opening 12 made in the side wall defining said sheath and of which the operation and architecture will be described in greater detail below.

Finally, the base also comprises another electric motor 10, with a functional shaft oriented perpendicularly to the shafts of the motors 7 and 9. Here again, these various features will appear more clearly in the analysis of the following figures.

With reference more particularly to FIG. 3, the sheath 1 comprises a first, hollow, rod 23 that is coaxial with said sheath 1. This rod 23 is secured at its top end to the member 2 for interaction with the latch of the battery and interacts at its bottom end with the link arm 4 at a sleeve 24. Accordingly the link arm 4 rotates the rod 23 relative to the axis of revolution of the sheath under the action of the motor 7 according to a limited clearance and consequently causes the member 2 to rotate.

Moreover, coaxially relative to the hollow rod 23, the device comprises another rod 18. This rod 18, which is therefore central, is also capable of rotation relative to the axis of revolution of the sheath 1 by means of the link arm 13 associated with the link arm 11 and the motor 9. Accordingly, it is connected to said link arm 13 by means of a sleeve 22, the assembly being positioned beneath the link arm 4 and the sleeve 24 as can be seen in FIG. 3.

By means of an abutment with balls and by means of rolling bearings 19, the rod 18 is also subjected to the action of a piston 16, that is underneath, incorporated into the sheath and capable of being moved in translation along the axis of revolution of the sheath by interaction with a cam 15. The latter is rotated by the shaft 14 of the motor 10, the shaft 14 in this instance being perpendicular to the axis of revolution of the sheath 1. This piston 16 is therefore capable of moving the rod 18 in translation, and therefore consequently of causing the member 3 to come out of the sheath as can be seen for example in FIG. 4b. In other words, the rod 18 is capable of being operated both in a translational movement and a rotational movement, these two movements being independent since they are generated by two different motors, in this instance motors 9 and 10.

Moreover, in order to allow the relative clearance of the link arm 13 from the plane in which it extends subsequent to the translational movement imparted on the rod 18, the latter is mounted on a swivel joint thus allowing a clearance compatible with the translation that it is desired to impart on the member 3, typically between 5 and 10 mm.

Figure 5:
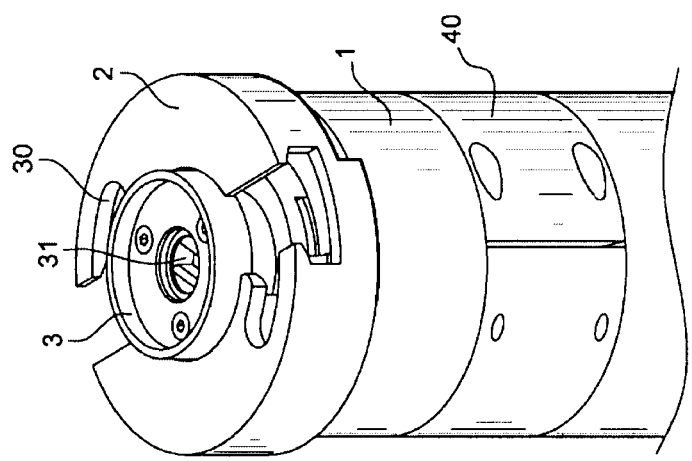
FIG. 5 is a schematic view in perspective illustrating in greater detail the top end of the device of the invention.
Figure 7:
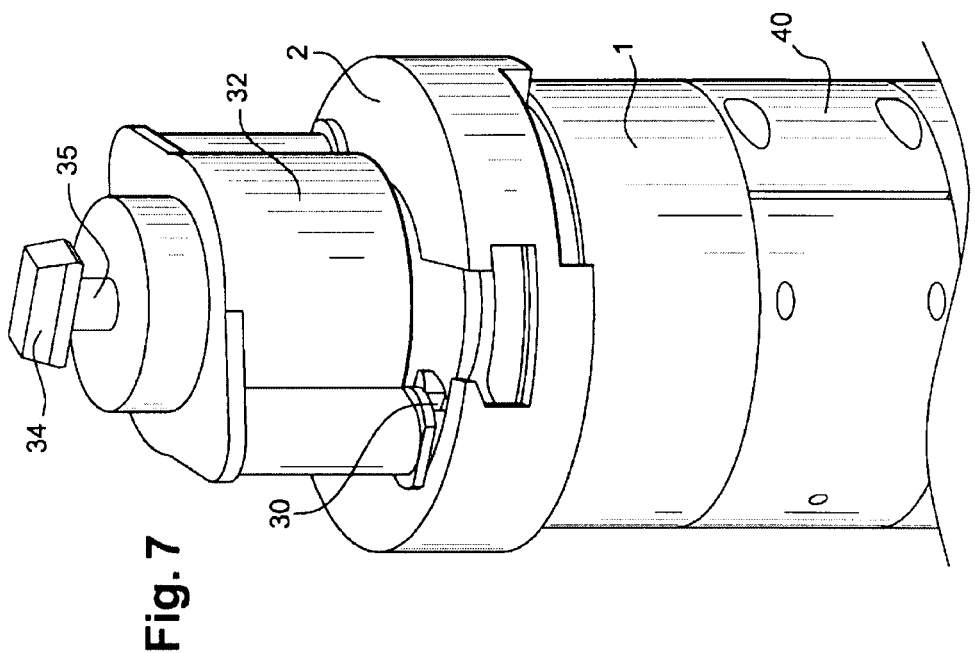
Figure 8:
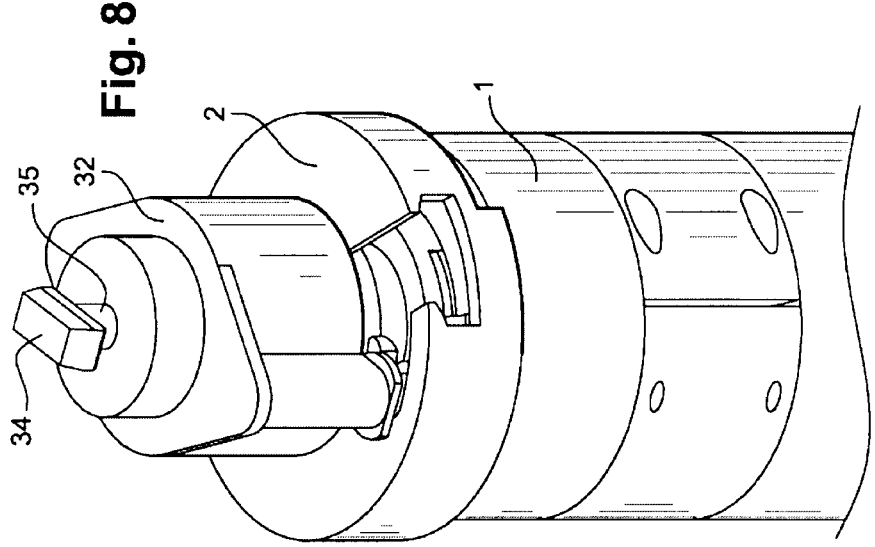

Shown with respect to FIG. 5 is a more detailed view of the top end of the sheath. It can be seen in particular that the member 2 for interaction with the latch has two apertures 30 designed to interact with protrusions or nipples 33 emanating from the latch 32 with which the battery is furnished.

The member 3 comprises at its center a recess 31 designed to interact with a matching protrusion (not shown) incorporated into the latch 32 and extending via a shaft 35 surmounted by the active portion 34 of the latch. Thus, the rotation of the member 3 causes the rotation of the recess 31 and consequently that of the active portion 34.

The presence of two apertures 30 designed to interact with protrusions or nipples 33 emanating from the latch 32 of the battery makes it possible to hold the battery when the piston 16 moves the rod 18 in translation in order to make the member 3 come out of the sheath. It is thus possible to place the battery in tension on its attachments of the vehicle as will be explained when the operating principle of the device is described.

The operating principle of the device according to the invention will be described in detail with respect to FIGS. 4a, 4b and 6 to 8.

Figure 6:
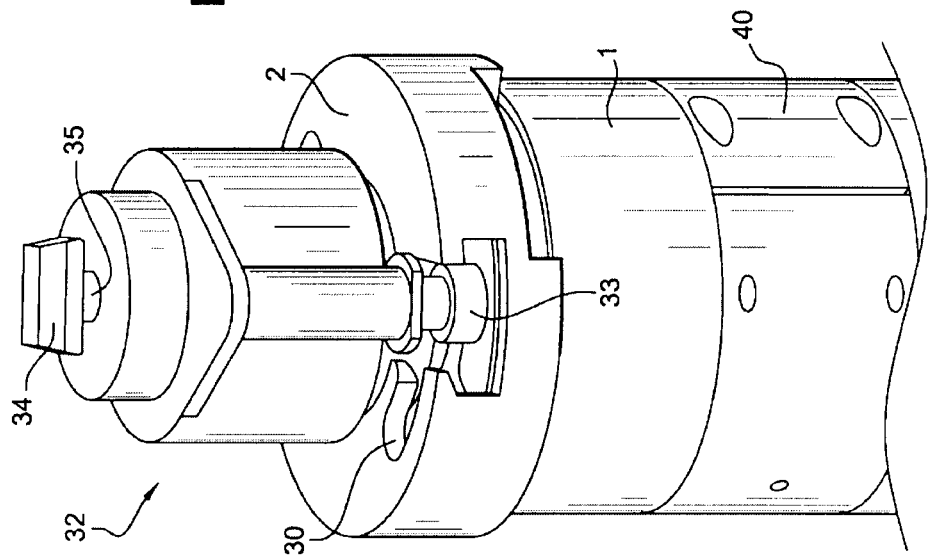
FIGS. 6, 7 and 8 are schematic representations in perspective illustrating the interaction of the device of the invention with a type of latch with which the structure that it is desired to lock/unlock is furnished.

In FIG. 4a, the rod 18 is in the bottom zone so that the member 3 is substantially flush with the top portion of the member 2. In this configuration and when the device of the invention is in contact with the latch 32 of the battery (as shown in FIG. 6), a rotary movement is imparted to the rod 23 in order to cause the rotation of the member 2 and consequently the interaction of the apertures 30 with the nipples 33 of the latch. This leads us then to the configuration shown in FIG. 7.

With the latch thus docked in the device of the invention, the pushing element of the piston 16 is activated via the motor 10 causing the member 3 to be pushed inducing the more pronounced protrusion of the active portion 34 of the latch 32. It is possible to apply a greater pressure than the nominal pressure allowing the protrusion of the active portion 34 of the latch 32 so that said active portion reaches the end of its travel. A rotational movement is then imparted to said rod 18 by means of the motor 9 and of the link arms 11 and 13 causing the active portion 34 to make a quarter turn, then interacting with a housing provided for this purpose within the motor vehicle. The locking movement continues by lowering the active portion 34 by means of the motor 10 and the associated members, which ensures that said portion 34 rests in its housing arranged within the vehicle. The battery is then placed in tension on the vehicle because a residual stress remains present in the assembly which makes it possible to provide an improved hold of the battery which may weigh several hundred kilos.

It should be specified that, in the example described, by default the active portion 34 of the latch 32 is prestressed, for example by means of a spring, so that it is in the low position as illustrated in FIG. 6. It will be possible to decide to apply a pressure of between two and five times the nominal pressure making it possible to compress the prestress means, for example the springs.

The locking/unlocking device of the invention is then released from the latch by further rotation, in the reverse direction, of the member 2, by means of the elements already described above.

When the locking is thus achieved, the process is then carried out in the reverse direction to release the device from the latch 32 and consequently from the battery.

The unlocking of the battery applies the same principle by reversing the various phases described above.

All the value of the device of the invention can be seen through the ease of installation and performing the locking and unlocking functions.

Notwithstanding the above, it is possible to adapt the various types of members 2 and 3 at the top end of the sheath, the latter advantageously being furnished with a clamp 40 assembling top elements suitable for interacting with a specific latch with the bottom portion capable of thus being standardized.

The invention claimed is:

1. A system including:
an element including a latch with a housing that rotatably receives a shaft of an active portion of the latch axially extending therethrough, the latch further comprising a pair of nipples axially extending from the housing; and
a device for locking/unlocking the latch, comprising:
a cylindrical sheath receiving coaxially:
a first hollow rod that can rotate relative to an axis of revolution of the sheath and comprising a top end of the first hollow rod which includes a pair of apertures for interlocking with the nipples of the latch of the element when the nipples are received within the apertures and the first hollow rod is rotated; and
a second rod, coaxial to and on the inside of the first hollow rod, that can move independently in translation and in rotation relative to the first hollow rod, respectively along and around the axis of revolution of the sheath, and comprising a top end of the second rod which includes a central recess for interlocking with the active portion of the latch when the active portion is received within the recess and the second rod is translated and rotated, so as to actuate the latch in an operational position of locking or of unlocking;
two link arms, each coupled to a respective one of the rods for rotating each of the two rods relative to the axis of revolution of the sheath, independently of one another; and
a cam with an axis of rotation perpendicular to the direction of translation, the cam abutting a piston colinear with and coupled to a lower end of the second rod, for translating the second rod along the axis of revolution independently of the rotation of the second rod.

2. The system as claimed in claim 1, wherein movement in translation of the second rod is powered by a first motor rotating the cam and displacing the piston colinear with the second rod, and wherein movement in rotation of the second rod is powered by a second motor connected to the second rod by at least one of the at least two link arms.

3. The system as claimed in claim 1, wherein each link arm is actuated by an electric motor, and the two link arms are substantially parallel with one another and oriented on two planes substantially perpendicular to the axis of revolution of the sheath.

4. The system as claimed in claim 1, wherein the coupling of the link arms to the respective rods is carried out inside the sheath, the sheath including an opening arranged in its side wall, of dimensions configured for desired clearance of the link arms and to a desired angle of rotation of the rods.

5. The system as claimed in claim 1, wherein the element is a battery in a motor vehicle.

* * * * *